United States Patent

Wyatt et al.

[15] 3,654,437

[45] Apr. 4, 1972

[54] OCTAL/DECIMAL CALCULATOR

[72] Inventors: Philip J. Wyatt; Albert S. Trundle; Judith B. Bruckner, all of Santa Barbara, Calif.

[73] Assignee: Science Spectrum, Santa Barbara, Calif.

[22] Filed: July 3, 1969

[21] Appl. No.: 838,833

[52] U.S. Cl. ..........235/84

[51] Int. Cl. ..........G06g 1/02

[58] Field of Search ..........235/70, 74, 78, 79.5, 83, 84, 235/85, 88

[56] References Cited

UNITED STATES PATENTS 1,214,040 1/1917 Jones..........235/84

*Primary Examiner*—Richard B. Wilkinson

*Assistant Examiner*—Lawrence R. Franklin

*Attorney*—James E. Hawes and David Rich

[57] ABSTRACT

A calculating device comprising a base member, a plurality of graduated scales arranged on the base member, and indicator means cooperating with the scales for performing a variety of calculations. The scales are graduated in octal base numbers and decimal base numbers for use in making conventional arithmetic and algebraic operations in both octal and decimal bases and for converting between these bases.

18 Claims, 2 Drawing Figures

INVENTORS.
PHILIP J. WYATT
ALBERT S. TRUNDLE
JUDITH B. BRUCKNER

BY

Christie, Parker & Hale
ATTORNEYS

PATENTED APR 4 1972

3,654,437

SHEET 2 OF 2

OCTAL/DECIMAL CALCULATOR

BACKGROUND OF THE INVENTION

1. Field of the Invention

This invention relates to calculating devices containing a plurality of scales and indicator means for establishing relations between the scales. More particularly, this invention relates to a calculator which permits the user to perform arithmetic and algebraic operations in an octal base mathematical system and to convert numbers between this base and the familiar decimal base.

2. Description of the Prior Art

The familiar system of mathematics is the so-called decimal or common system which is based upon the nine distinct integers 1,2,3,4,5,6,7,8,9, plus 0. There is a great need both from the educational and scientific point of view to be able to perform arithmetic and algebraic calculations in a system commonly referred to as octal. This system in turn is based upon the binary number system wherein all quantities are represented by combinations of the symbols "1" and "0". The binary system is particularly useful in all types of electronic circuitry and in particular digital computers since the symbol "1" may therein represent the condition "on" and the symbol "0" may represent the condition "off". For convenience, binary bits are collected in groups of three in many computers. A grouping of three binary bits is capable of representing integer values from 1 through 7, since the largest three bit number in the binary system is 111, which is equivalent to the integer 7. Thus, a particular group of three binary bits is easily represented in terms of an octal numbering system, that is, one that consists of the integers 1,2,3,4,5,6 and 7 in addition to 0.

During batch processing, the memory of a computer is often dumped to permit a careful examination by programmers or systems analysts. This dumping process is most easily performed in an octal system. It remains for the recipient of such a dump listing to interpret the operations of the machine program in terms of the more familiar decimal numbering system. The conversion between the decimal and octal base systems is a difficult procedure and limits the usefulness of dump listings. It would be ideal if the machine user were able to be as conversant in an octal system as he is in a decimal system. If this were possible, he would no longer be concerned with the conversion between the two bases. The current invention permits the user to perform most algebraic and arithmetic operations in an octal base and convert between octal and decimal.

In addition to the above usefulness of the invention to the computer programmer and systems engineer, it is a particularly useful tool for the teaching of basic concepts of mathematics. For example, the fundamental operations of arithmetic and algebra are independent of the numerical base used. Unfortunately, these concepts are often taught in a manner which leads the student to believe that they are only valid in the familiar decimal system. With the present invention, the instructor may demonstrate many important arithmetic and algebraic principles in the less familiar octal base and then compare the final answers with the decimal results. Further, it is often useful for an instructor to convert numbers in an unfamiliar system, such as octal, to a decimal system when explaining the basic relationships between number systems. The calculator of this invention enables the instructor to perform calculations in the octal system and convert to decimal rapidly and accurately, thereby improving his teaching proficiency.

It should be appreciated that there are no known tables in existence of the octal logarithms of octal numbers, expressed in octal. Since these tables do not exist, the performance of various algebraic and trigonometric operations in octal base is particularly difficult even to one skilled in the art. With the present invention, however, referral to such tables becomes unnecessary and the aforementioned operations are readily performed. The multiplication, addition, subtraction, and division operations involving octal numbers have, until this time, been performed by means of elaborate tables and procedures, most of which are usually referred back to a decimal base. Further, in the past, desk-top mechanical calculators have been manufactured for performing relatively simple arithmetic operations in octal. These devices were costly, time-consuming and difficult to operate. The present invention makes even the most difficult calculations in octal base relatively simple to perform.

SUMMARY OF THE INVENTION

Generally speaking, the calculator of this invention includes a base member and an octal base scale thereon having octal base numbers graduated in ascending order. The numbers are arranged to divide the length of the scale into a plurality of segments defined by indicia corresponding to the octal numbers 1 through 10. The indicia are preferably arranged to divide the scale into seven major segments, with each segment having graduations corresponding to fractional portions of each of the above octal numbers. The relative positions of the numbers with reference to the scale are a function of the octal (base 8) logarithm of each number. Indicator means movable relative to the base member are provided for adding intervals corresponding to selected portions of the scale and indicating a resultant value thereon. Preferably, the relative positions of the octal base numbers with reference to the index of the scale are determined by the relationship $L(\log_{10}X)\ (\log_8 10)$, where X is the decimal representation of an octal number between 1 and 10 whose position on the scale is to be determined and $L$ is a quantity representing the effective length of the scale. For a linear scale, L represents the full length of the scale in inches or centimeters for example, and for a circular scale, $L$ represents 360°. The octal base scale enables the user of the calculator to perform conventional multiplication and division of octal base numbers rapidly and accurately. The savings of time is substantial when considering that simple multiplication of two octal base numbers requires searching octal multiplication tables for the products of single octal integers and then carrying and adding in a manner prescribed by octal addition relations. This procedure is time-consuming even if tables or octal multiplication and addition are available.

This invention further includes a series of various scales for use in combination with the aforementioned octal base scale to permit multiplication, division, exponentiation, squaring, and the taking of square roots and logarithms in, with respect to, and expressed in an octal base. An inverse octal base scale having an effective length equal to that of the octal base scale is provided with octal base numbers graduated in descending order relative to the octal base scale. The numbers on the inverse octal base scale preferably are arranged to logarithmically divide the length of the scale into seven major segments, with indicia corresponding to the octal numbers 1 through 10. The seven major segments have graduations corresponding to fractional portions of the octal integers 1 through 7. The indicator means of this invention is movable relative to the base means for adding intervals corresponding to selected portions of either the octal base or the inverse octal base scale and indicating resultant values on either of the scales. The inverse octal base scale is particularly useful in performing multiple operations in octal involving several multiplications and divisions without the necessity of recording partial products or quotients.

This invention also includes an octal square scale having an effective length equal to that of the octal base scale with octal numbers graduated in ascending order. The scale is divided into two sections of equal length, and each section is further divided logarithmically into a plurality of segments defined by indicia corresponding to the octal numbers 1 through 10. The octal square scale is useful in calculating the squares of octal numbers selected from the octal base scale. Conversely, square roots of octal numbers selected from the octal square scale are located on the octal base scale. The octal square scale is especially useful because the manual taking of square roots is a complex process, particularly in view of the difficulty in manually dividing and carrying numbers in the unfamiliar octal base system.

This invention further provides an octal logarithm scale for use in combination with the octal base scale. The octal logarithm scale has octal base numbers linearly graduated in ascending order and preferably arranged to divide the scale into eight segments of equal length. The scale's primary indicia correspond to the octal fractions between 0 and 1, that is 0, .1, .2, .3, .4, .5, .6, .7, and 1.0. The octal logarithm scale is used to calculate octal mantissas of octal logarithms of numbers selected from the octal base scale. The scale may also be used to calculate exponentials of octal numbers in octal. The octal logarithm scale is further used in combination with a colinear decimal logarithm scale (a linear representation of the decimal fractions between 0 and 1.0) and an indicator means to convert fractions between the octal and decimal bases. Furthermore, fixed point addition and subtraction to three significant figures in octal, if desired, is performed using the octal logarithm scale.

In order to represent a broad range of numbers, the so-called floating point notation is used by systems analysts and computers alike. In this description a number is represented as a fraction times a power of the base; for example, the number 684 (in decimal) would be represented as $0.684 \times 10_3$. In a binary system the number 11001.11 would be represented as $0.1100111 \times 10^{101}$. (Here the latter factor 10 is the binary representation of the number 2, that is, the base of the binary system. The exponent 101 is the binary representation of the octal number 5; that is, it corresponds to number of positions that the binary point has been moved to the left.) A number of computers operate in a binary system but express the results in an octal base. Thus, the binary number 11001.11 is represented as the octal number 31.6, and its floating point representation $0.1100111 \times 10^{101}$ would be expressed in octal as $0.634 \times 2^5$. The result is that a computer represents an octal floating point number in memory as a mixture of an octal fraction between 0.4 and 1.0 times an octal power of 2 (not 8). This normalized form ensures the greatest number of binary significant figures, since the octal fractions between 0.4 and 1.0 have a binary bit in the most significant position of the fraction. However, this hybrid representation causes innumerable problems in the conversion between the decimal and octal bases, particularly for programmers and systems engineers required to convert between the systems when analyzing a dump listing or the like. The present invention reduces such conversions to very simple operations by means of an octal normalization scale used in combination with the octal base scale. The octal normalization scale has an effective length equal to that of the octal base scale, and has octal base numbers graduated in ascending order. The numbers are arranged to divide the scale into three identical sections of equal length, each section being further divided logarithmically into segments defined by indicia corresponding to the octal integers 4 through 7. In use, octal numbers selected from the octal base scale are shown in their normalized form on the octal normalization scale.

This invention contemplates use of decimal conversion scales in combination with the octal base scale for converting octal numbers to decimal numbers and vice versa. Each decimal conversion scale has an effective length equal to that of the octal base scale, and has decimal base numbers graduated in ascending order from $8^M$ to $8^{M+1}$, where $M$ may represent any integer including 0. A preferable range of scales includes the integers from −5 to 5. The relative positions of the numbers with reference to the scale are a function of the octal logarithm of each number. The invention further contemplates use of the aforementioned octal normalization scale in combination with the decimal conversion scales for converting decimal numbers selected from a particular decimal conversion scale into octal floating point numbers located on the octal normalization scale. In use, fixed point decimal multiplication and division can be performed using the decimal conversion scales, and the resultant decimal value can be immediately converted to its respective octal equivalent on the octal base scale, or to its respective octal floating point equivalent on the octal normalization scale. Conversely, octal multiplication and division can be performed using the octal base scale, with the resultant value being converted immediately into its decimal equivalent on the decimal conversion scales.

The calculator of this invention further provides an octal powers of two scale for use in combination with a conventional decimal base scale, i.e., the "C" or "D" scale, to convert octal powers of 2 into their decimal equivalents. From the above discussion, it is apparent that a computer represents an octal floating point number in memory as a mixture of an octal fraction between 0.4 and 1.0 times an octal power of 2. Conversion between the decimal and octal bases is often difficult and time-consuming because the decimal equivalent of an octal power of 2 cannot be readily calculated. The octal powers of two scale reduces such conversions to very simple operations.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENT

Figure 1:
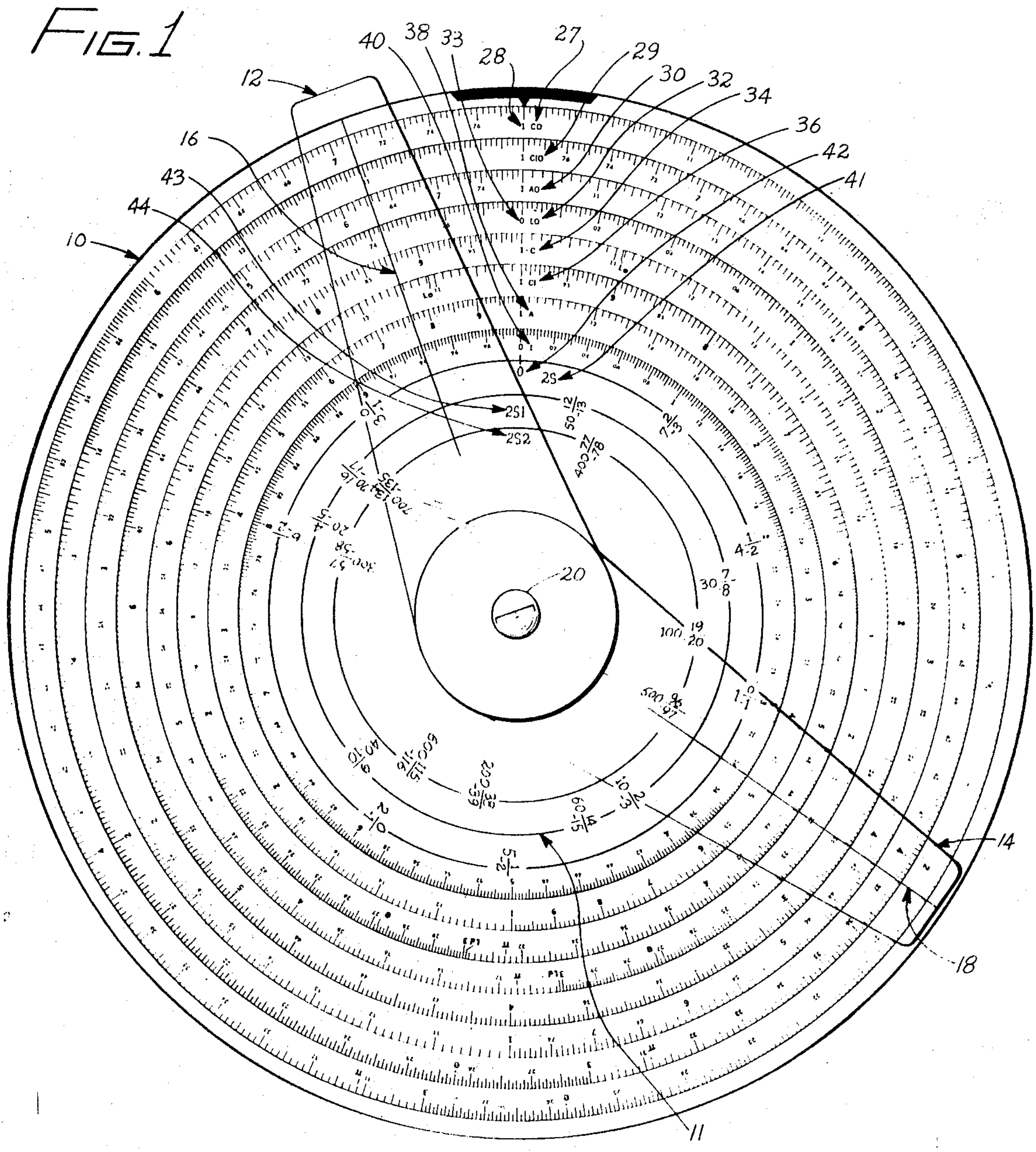
FIG. 1 is an elevational view showing one face of a circular version of the calculating device of this invention having thereon the octal base, inverse octal base, octal square, octal logarithm, and octal powers of two scales in combination with decimal base scales ordinarily used in conventional slide rules.

Referring to the drawings, the calculating device of this invention includes a flat circular base member 10 having a front face 11 and a pair of indicator arms 12 and 14 extending outwardly from the center of face 11. Arms 12 and 14 preferably comprise thin transparent plastic plates respectively provided with elongated centrally disposed hairlines 16 and 18. The indicator arms are secured to the center of base member 10 by an externally threaded screw 20 which extends through holes in the indicator arms and through a centrally disposed hole in the base member for engagement with an internally threaded fastening member 21 on an opposing reverse face 22 of base member 10. A pair of similarly constructed indicator arms 23 and 24 respectively provided with centrally disposed hairlines 25 and 26 are secured to the center of reverse face 22. Indicator arms 12, 14, 23, and 24 are movable relative to base member 10. Preferably, indicator arm 12 is slightly longer than arm 14, and arm 12 is mounted adjacent to face 11 of base member 10 with arm 14 overlapping arm 12. Arms 12 and 14 move as a unit when arm 12 is rotated, but arm 12 remains stationary when arm 14 is moved. Similarly, indicator arm 23 is longer than arm 24 and is mounted adjacent to reverse face 22 with arm 24 overlapping arm 23. Arms 23 and 24 move as a unit when arm 23 is rotated, but arm 23 remains stationary when arm 24 is moved.

Referring to FIG. 1, a plurality of inwardly converging, concentric scales in accordance with this invention are located on face 11 of base member 10. While this arrangement of scale is preferred from a practical operating standpoint, it will be understood that the principles of the invention may be adapted for use on linear slide rule structures, for example. As shown in FIG. 1, a circular octal base scale having a label CO at 27 is located adjacent to the outer periphery of base member 10. The CO scale is graduated in accordance with the octal logarithms of octal numbers from 1 through 10. The scale extends 360° around the face of base member 10, and the origin ($1_8$) and end ($10_8$) of the scale is defined by an index numeral "1" indicated at 28. As shown in FIG. 1, the CO scale is divided into seven primary segments by indices representing the seven octal numbers 1,2,3,4,5,6, and 7. Each of these segments is preferably divided into eight secondary segments corresponding to the set of possible second significant octal figures 1,2,3,4,5,6,7, and 0. Each of these segments is further divided into smaller segments. When using the CO scale, the location of three-significant-figures numbers is determined by interpolating in the octal number system. Therefore, the octal number 64.4 lies approximately midway between the indices defining 64.0 and 65.0.

The angular locations $Y$ of the CO scale indicia (expressed in the familiar decimal degree manner) are given by the formula $$Y^\circ \times 360^\circ (\log_{10} X)(\log_8 10)$$

where $X$ represents a real decimal number between 1 and 8 corresponding to an octal number between 1 and $10_8$. The octal number $10_8$ is equivalent to the decimal number 8. Corresponding to each value of $X$ whose indicial location $Y$ is desired is a label $\xi$. This label is the octal value corresponding to the decimal number $X$. Thus, for example

| X (decimal) | | $\xi$ (octal) |
|---|---|---|
| 1 | | 1 |
| 1.93 | 1.734 | |
| 2 | | 2 |
| 3.5 | | 3.4 (i.e. 3 plus four-eighths) |
| 7.25 | | 7.20 |

$Y$ represents the angular displacement of the number $X$ (whose octal representation is $\xi$) from the CO scale index in decimal degrees. If the factor 360° is replaced by $L$ where $L$ is the total length of a linear CO scale in inches or centimeters, for example, then $$Y = L (\log_{10} X)(\log_8 10)$$

yields the distance Y of a given decimal value $X$ (whose octal equivalent is $\xi$) from the origin of such a linear embodiment of the calculator.

The CO scale is primarily used in performing octal base multiplication and division operations. The multiplication of the two numbers A and B is achieved by first setting hairline 16 of indicator arm 12 at A on the CO scale, and then setting hairline 18 of indicator arm 14 at the index 1 on the same scale. Next, the hairline of indicator arm 12 is moved until the hairline of arm 14 is at B. The result appears beneath the hairline of arm 12 on the same scale.

EXAMPLE A

Evaluate $15_8 \times 5_8$

This problem may be solved with the calculator of this invention as follows:

Set the hairline of indicator arm 12 at 15 on the CO scale. Move the hairline of arm 14 to index 1 on the CO scale. Move arm 12 until the hairline of arm 14 is at 5 on the CO scale. Read 101 at the hairline of arm 12 on the CO scale. Thus, $$15_8 \times 5_8 = 101_8.$$

It will be appreciated that the solution of this simple problem is relatively difficult and time-consuming at present without the aid of this invention because it requires a familiarity with the octal multiplication table

| X | 1 | 2 | 3 | 4 | 5 | 6 | 7 | 10 |
|---|---|---|---|---|---|---|---|---|
| 1 | 1 | 2 | 3 | 4 | 5 | 6 | 7 | 10 |
| 2 | 2 | 4 | 6 | 10 | 12 | 14 | 16 | 20 |
| 3 | 3 | 6 | 11 | 14 | 17 | 22 | 25 | 30 |
| 4 | 4 | 10 | 14 | 20 | 24 | 30 | 34 | 40 |
| 5 | 5 | 12 | 17 | 24 | 31 | 36 | 43 | 50 |
| 6 | 6 | 14 | 22 | 30 | 36 | 44 | 52 | 60 |
| 7 | 7 | 16 | 25 | 34 | 43 | 52 | 61 | 70 |
| 10 | 10 | 20 | 30 | 40 | 50 | 60 | 70 | 100 |

to calculate partial products, and the octal addition table

| + | 1 | 2 | 3 | 4 | 5 | 6 | 7 | 10 |
|---|---|---|---|---|---|---|---|---|
| 1 | 2 | 3 | 4 | 5 | 6 | 7 | 10 | 11 |
| 2 | 3 | 4 | 5 | 6 | 7 | 10 | 11 | 12 |
| 3 | 4 | 5 | 6 | 7 | 10 | 11 | 12 | 13 |
| 4 | 5 | 6 | 7 | 10 | 11 | 12 | 13 | 14 |
| 5 | 6 | 7 | 10 | 11 | 12 | 13 | 14 | 15 |
| 6 | 7 | 10 | 11 | 12 | 13 | 14 | 15 | 16 |
| 7 | 10 | 11 | 12 | 13 | 14 | 15 | 16 | 17 |
| 10 | 11 | 12 | 13 | 14 | 15 | 16 | 17 | 20 |

for carrying and adding octal numbers.

The octal division operation A B is achieved by first setting hairline 16 of inductor arm 12 at A on the CO scale, and then setting hairline 18 of arm 14 at B on the CO scale. Next, arm 12 is moved until the hairline of arm 14 is at the CO scale index 1. The result appears below the hairline of arm 12 on the CO scale.

EXAMPLE B

Evaluate $762_8 \div 254_8$

Set the hairline of arm 12 at 762 and the hairline of arm 14 at 254, both on the CO scale.

Move arm 12 until the hairline of arm 14 is at 1. Read 272 at the hairline of arm 12 on the CO scale. The three-significant-figures number presented now requires an appropriate octal point. Thus, for example, $$7.62_8 \div 254_8 = 2.72_8 \times 10_8{}^{-2}; \text{ or}$$

$$762_8 \div 0.254_8 = 2.72_8 \times 10_8{}^{3}.$$

It should be appreciated that even simple division is an extremely difficult task in the unfamiliar octal system when performed manually. This operation requires the carrying and subtraction of numbers in the octal system, and ordinarily requires constant referral to the above multiplication table, even for the most skilled mathematician.

A circular inverse octal base scale having a label CIO at 29 is shown located inwardly of and adjacent to the CO scale. The CIO scale is graduated in exactly the same manner as the CO scale, but in the reverse direction. Thus, the octal numbers 1 through $10_8$ are graduated in logarithmically ascending order in a counterclockwise direction along the scale. Each number located on the CIO scale is the reciprocal of the corresponding number on the CO scale. The CIO scale is thus used for calculating octal reciprocals of given octal numbers, along with performing octal multiplication in a manner alternative to that described for the CO scale. The scale is particularly useful in performing multiple operations involving several multiplications or divisions. For example, the product of three numbers, A × B × C, is most easily calculated by treating it as $$\left(A \div \frac{1}{B}\right) \times C.$$

This problem is solved by setting indicator arm 12 at A on the CO scale and arm 14 at B on the CIO scale. If arm 12 were now moved until arm 14 where at 1, the product A × B would be at arm 12 on the CO scale. Instead, however, arm 12 is moved until arm 14 is at C on the CO scale and the result is read at arm 12 on the CO scale.

Example C

Calculate $2_8 \times 3_8 \times 4_8$

Set hairline 16 of arm 12 at 2 on the CO scale, then set hairline 18 of arm 14 at 3 on the CO scale. Move arm 12 until the hairline of arm 14 is at 4 on the CO scale. Read 30 at the hairline of arm 12 on the CO scale. Thus, $$2_8 \times 3_8 \times 4_8 = 30.$$

An octal square scale having a label AO at 30 is shown located inwardly of and adjacent to the CIO scale. The 360° length of the AO scale contains two successive CO scales. The octal numbers read from the AO scale will correspond to the figure obtained after squaring the number indicated at the same radial on the corresponding CO scale. The index 1 of the AO scale is aligned with the indices of the CO and CIO scales; and the angular locations $Y$ and $Y'$ of decimal numbers $X$ corresponding to the octal labels $\xi$ with reference to the index of the AO scale are given by the following relationship:

$$Y^\circ = 180^\circ (\log_{10}X)(\log_8 10)$$

$$Y'^\circ = 180^\circ [1+(\log_{10}X)(\log_8 10)]$$

Thus, the octal representation of each number $X$ appears twice on the AO scale, and the two locations are 180° apart. If the factors 180° are replaced by half the length L (i.e., L/2) of a linear embodiment of this invention as heretofore discussed, then the factors $Y$ and $Y'$ correspond to the distances of the appropriate indicia from the origin of said embodiment. The squares of the octal numbers on the CO scale are found on the same radial on the AO scale.

EXAMPLE D

Evaluate $(25_8)^2$

Set hairline 16 of arm 12 at 25 on the CO scale, and read 671 on the AO scale. Thus, $$25_8 \times 25_8 = 671.$$

Similarly, the square roots of octal numbers on the AO scale are found on the same radial at the CO scale. Care must be taken, however, to insure that the initial number is set at the proper section of the AO scale. This is done by re-expressing each number whose square root is to be calculated into a number between 1 and $100_8$ times an even power of $10_8$, a familiar operation derived from experience with conventional decimal base slide rules. After factoring out the even power of $10_8$, if the remaining factor be between 1 and $10_8$ the number is set in the first sector of the AO scale. If the remaining factor is between $10_8$ and $100_8$, then the number is set in the second sector.

EXAMPLE E

Evaluate $\sqrt{671_8}$

Rearrange: $\sqrt{671_8 = 6.71_8 \times 10_8 2} = \sqrt{10_{8\ 6.718}}$

Set hairline 16 of arm 12 at 671 on the first AO scale and read the figure 250 at the hairline of arm 12 on the CO scale. Therefore, $$\sqrt{671_8} = 2.5_8 \times 10_8 = 25_8.$$

An octal logarithm scale having a label LO at 32 is shown located inwardly of and adjacent to the AO scale. The LO scale is a linear scale representing octal fractions between 0 and 1.0. The mantissas of the octal logarithms of CO scale numbers are found at the same radial on this scale. The scale is divided into eight major segments of equal length with indicia corresponding to the octal fractions between 0 and 1.0. The origin of the scale above is defined by an index 0 at 33 which is aligned with the indices of the CO, CIO, and AO scales. The angular location $Y$ of a decimal number $X$ whose octal representation is $\xi$ with reference to the index of the LO scale is determined by the following relationship:

For $0 \leq X < 8$, $$Y = 45^\circ X$$

If the factor 45° is replaced by L/4, where L is the length of a linear embodiment of the present invention, then $Y$ corresponds to the distance of the appropriate indicia from the origin of such a linear embodiment of the calculator.

The LO scale is useful in calculating octal mantissas of CO scale numbers. To find the logarithm of an octal number, the number should first be expressed as a figure between 1 and $10_8$ times an integral power of $10_8$. The mantissa (a positive fraction between 0 and 1) is found by setting the number on the CO scale and reading the mantissa on the LO scale.

EXAMPLE F

Calculate $\log_8 (414_8)$ $$\log_8 (414_8)$$
$$= \log_8(4.14_8 \times 10_8{}^2)$$
$$= \log_8(4.14_8) + \log_8(10_8{}^2)$$
$$= \log_8(4.14_8) + 2$$

Set hairline 16 of arm 12 at 414 on the CO scale, and read 0.5404 at the hairline of arm 12 on the LO scale. Hence, $$\log_8(414_8) = 0.5404_8 + 2 = 2.5404_8.$$

Exponentiation of octal numbers is achieved using the LO scale in conjunction with the CO scale. To calculate a quantity $X = a^b$, for example, note that $$\log X = b \log a.$$

Therefore, $$X = \text{antilog } (b \log a)$$

Thus, the simplest procedure for calculating $X$ is to multiply the logarithm of $a$ by $b$ and then take the antilogarithm of the result.

EXAMPLE G

Calculate $77_8{}^\pi$ in octal.

$$\log_8 77 = \log_8 (7.7 \times 10_8) = 1.0 + \log_8(7.7)$$

$\log_8(7.7) = 0.774$ (from CO and LO scales, as above).

Therefore, $$\log_8 77 = 1.744$$

Using the CO scale to perform octal multiplication, $$1.774_8 \times \pi_8 = 6.205_8$$

Therefore, $$77_8{}^\pi = \text{antilog}(6.205_8) = (\text{antilog}_8\ 0.205) \times 10_8{}^6$$
$$= 1.557_8 \times 10_8{}^6$$

Although the above computation appears to be somewhat cumbersome, it should be appreciated that octal exponentiation is extremely difficult to perform in conventional means without the aid of octal logarithm tables, which tables are nonexistent at the present time.

Face 11 of base member 10 further comprises a series of conventional circular decimal base scales converging inwardly from the above-described octal scales. A standard decimal base scale having a label C at 34 is located inwardly of the CO scale; an inverse decimal scale having a label CI at 36 is located adjacent the C scale; a decimal square scale having a label A at 38 is located adjacent the CI scale; and finally, a decimal logarithm scale having a label L at 40 is located adjacent the A scale.

The innermost set of scales on face 11 of base member 10 is a series of scales for rapidly converting octal powers of 2 into their decimal equivalents. The numbers appearing on the scale represent octal powers $M$ of the value $(2^M)_8$. A preferred arrangement includes a first outermost octal powers of two scale having a label 2S at 41 and an index of origin 0 at 42, a second scale having a label 2S1 at 43, and a third scale having a label 2S2 at 44. The 2S scale contains a series of octal units 1,2,3,4,5,6,7; the 2S1 scale contains a series of octal "tens" 10,20,30,40,50,60,70; and the 2S2 scale contains a series of octal "hundreds" 100,200,300,400,500,600,700. Octal powers of 2 are converted into their decimal equivalents using the 2S scales in conjunction with the decimal base C and CI scales discussed above. Thus, any octal power of 2 between and including the numbers $2^{-777}$ and $2^{777}$ is converted to its decimal form since any such number may be represented as a set of factors each of which individually appears on the 2S scales. Thus, for example, $2^{44} = 2^{40} \times 2^4$. This latter product may be calculated as described earlier using the indicia corresponding to 40 and 4 on the 2S scales. The product of the resultant values is then calculated as described earlier using the C scale. Alternatively, a number not appearing on the 2S scales, such as $2^{44}$, can be converted into its decimal equivalent by adding intervals corresponding to its factors, e.g., $2^{40}$ and $2^4$, on the 2S scales and reading the result on the C scale. For negative powers of 2, decimal equivalents are read on the CI scale.

The angular locations $Y$ of the octal powers $M$ with reference to the 2S scale index 0 are determined by the following relationships:

$Y° = 360°$ [mantissa of $(\log_{10}X)$] where $X$ is the decimal representation $2^M$, and $M$ represents a positive octal integer.

Thus, for octal power 3 located on the 2S scale, $X = 2^3 = 8$, and location $Y = 360°\ (0.90309) = 325.11°$ in a clockwise direction from index 0. Similarly, the angular locations $Y$ of negative octal powers with reference to the scale index are determined by the above relationship, but the result is read on the CI scale.

If the factor 360° In the above equation is replaced by L, where L is the length of a linear embodiment of this invention, then the factor $Y$ corresponds to the distances of the appropriate indicia from the origin of said embodiment.

EXAMPLE H

Evaluate $(2^{10})_8$ in decimal form

Set indicator hairline 16 of arm 12 at 10 on the 2S1 scale, and read 256 on the C scale. Thus $$(2^{10})_8 = 256_{10}.$$

The indicia of the 2S scales are preferably characterized by three numbers: a radial number indicating the octal power of 2, a positive number corresponding to the positive power of 10 (decimal base) to which the C scale number corresponds, and a negative number corresponding to the negative power of 10 (decimal base) to which the CI scale number corresponds. The numbers read from the C or CI scales represent numbers between 1 and $10_{10}$ (decimal base). Thus, in the preferred embodiment, the symbol

10 2/_3 is interpreted as follows: 10 is an octal number equivalent to 8 in decimal, and represents the positive or negative octal power of 2 whose decimal equivalent is required. The long bar represents the corresponding indicial mark upon which the hairline of the indicator means is set. The integer 2 corresponds to the positive power of $10_{10}$ by which the factor on the C scale must be multiplied to yield the correct final result if $(2_{10})_8$ is required. The integer −3 corresponds to the negative power of $10_{10}$ by which the factor on the CI scale must be multiplied to yield the correct result if $(2^{-10})_8$ is required. If the hairline of the indicating means is aligned with said example indicia, the value on the same radial at the C scale yields the immediate result $$(2^{10})_8 = 2.56_{10} \times {10_{10}}^2.$$

Similarly, at the CI scale the result is $$(2^{-10})_8 = 3.9_{10} \times {10_{10}}^{-3}.$$

Figure 2:
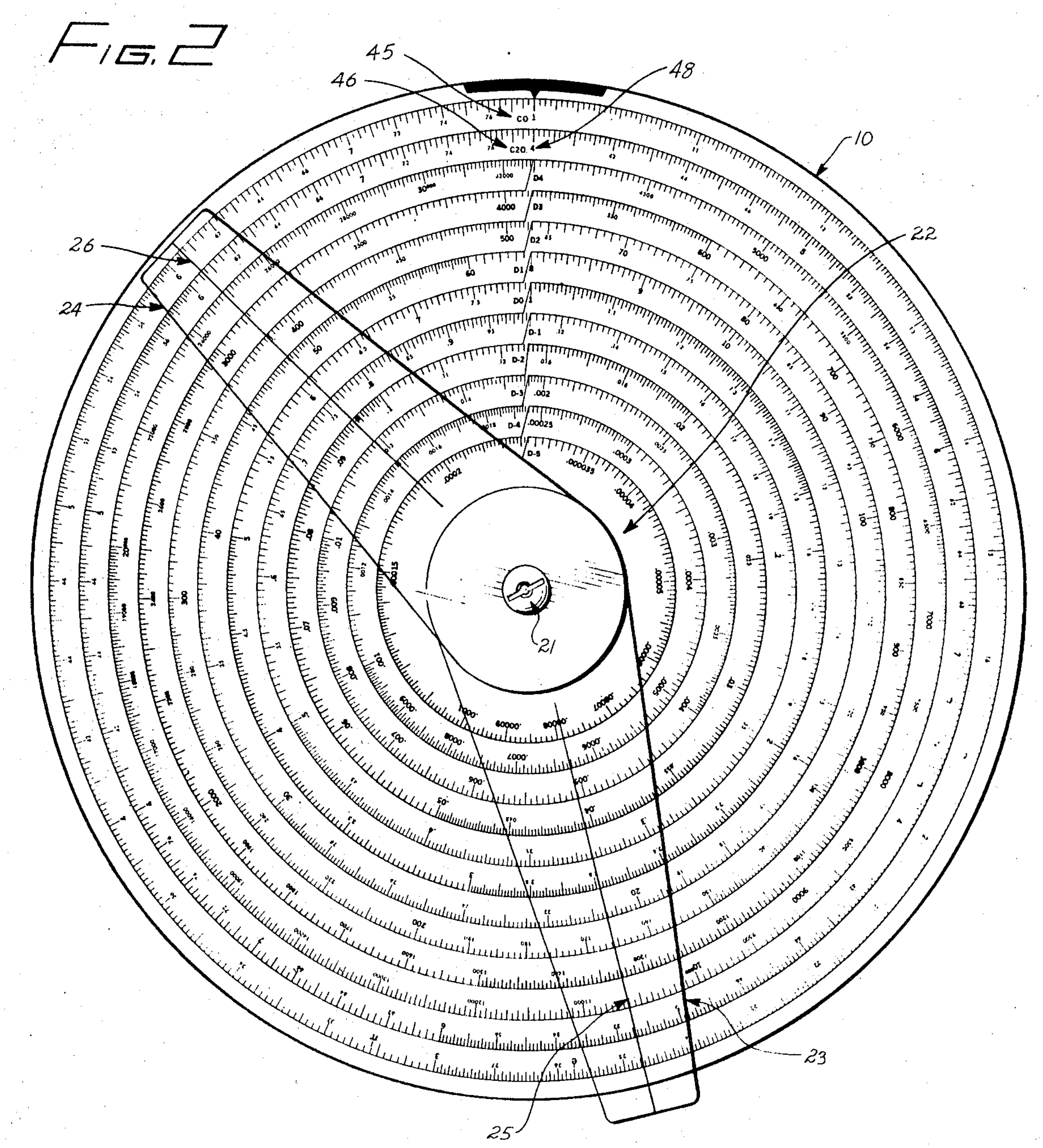
FIG. 2 is an elevational view showing the opposite face of the calculating device of FIG. 1 having thereon the octal base, octal normalization, and decimal conversion scales of this invention.

Referring to FIG. 2, reverse face 22 of base member 10 comprises a preferred embodiment of a series of inwardly converging concentric circular scales beginning with an outermost octal base scale having a label CO at 45. An octal normalization scale having a label C2O at 46 is shown located inwardly from the CO scale. The C2O scale consists of three successive identical sections of a CO scale from $4_8$ to 10. That is, the C2O scale is divided into three segments of equal length, each segment having an index of origin represented by $4_8$. Progressing clockwise from C2O scale index 4 at 48, the first sector corresponds to the CO scale numbers immediately above it multiplied by $2^2$; the next sector corresponds to the CO scale numbers immediately above it multiplied by 2; and the third sector corresponds to the CO scale numbers immediately above it multiplied by 1, i.e., $2^0$. This scale is used in the conversion of normalized octal floating point numbers into decimal, and vice versa. The index 4 of the C2O scale is aligned with the index 1 of the CO scale, and the angular locations $Y$, $Y'$, $Y''$ of decimal numbers $X$, whose octal equivalent $\xi$ is between 4 and $10_8$, with reference to the index of the scale are given by the following relationships:

$$Y = 360°\ (\log_{10}X)\ (\log_8 10)$$

$$Y' = 360°\ (\log_{10}X)\ (\log_8 10) - 120°$$

$$Y'' = 360°\ (\log_{10}X)\ (\log_8 10) - 240°$$

Thus, each decimal number $X$ appears three times on the scale of the preferred embodiment, and the locations are 120° apart. If the factor 360° is replaced by L and the numbers 120° and 240° be replaced by L/3 and 2L/3, respectively, where L represents the length of a linear embodiment of this invention, then the factors $Y$, $y'$, and $Y''$ correspond to the distances of the appropriate indicia from the origin of said embodiment.

As discussed above, the conventional octal numbers are often most conveniently expressed in so-called normalized form. This form is expressed as an octal fraction between $0.4_8$ and 1.0 times an octal power of 2. Such a form insures a significant binary integer (i.e., the integer 1) in a position immediately to the right of the binary point. Shifting binary positions to insure this type of fraction requires that shifts be accomplished in units of one bit rather than in groups of three bits. The octal fraction must therefore be multiplied by a power of 2, the power normally being expressed as an octal number. The conversion between conventional numbers and normalized floating point octal numbers is by no means trivial. A conventional procedure is to first express the octal number in terms of its binary representation, shift the binary point to an appropriate position to insure a significant binary integer to the right of the binary point, and finally re-express the binary number in octal. For example, to convert the octal number 144 into normalized floating point form, one would first represent each integer in terms of its binary equivalent, i.e., 144 = 001 100 100. The binary point is then shifted seven places to the left to yield $0.11001 \times 10^{111}$ (the binary number 111 is equivalent to the decimal number 7). Re-expressing this last result in octal yields $0.62 \times 2^7$. The actual reduction to normalized form by suitable multiplication by $2^2$ or $2^1$ is readily achieved using the C2O and CO scales on the calculator of this invention. Setting the fraction in question on the CO scale immediately yields the proper multiplication factor and resultant product on the C2O scale below it. Thus, the hairline of indicator arm 23 or 24 is set at the fraction to be converted at the CO scale, and then the "shifted" fraction is read at the same hairline at the C2O scale. If this latter value falls into the first sector of the C2O scale reading clockwise, the multiplying factor was $2^2$. If it falls into the second sector, the factor was 20. If it falls into the last sector, the factor was 1 ($2^0$), i.e., no "shifting" was required. Thus, the solution to the above problem is solved by the calculator of this invention by setting the hairline of indicator arm 23 or 24 at 144 on the CO scale with the immediate result of $0.62 \times 2^7$ which may be read from the C2O scale immediately below.

EXAMPLE I

Reduce $4.67_8 \times {10_8}^3$ to normalized form $= 0.467_8 \times {10_8}^4$ (note that the fraction was already in normalized form)

$= 0.467_8 \times ({2_8}^3)^4$ $= 0.467_8 \times (2^{14})_8$ (note that the exponent of 2 is in octal)

EXAMPLE J

Reduce $15.32_8 \times {10_8}^{-15}$ to normalized form.

$= 0.1532_8 \times {10_8}^{-13}$

The octal fraction 0.1532 is too small for normalized form; that is, the fraction does not fall between $0.4_8$ and 1.0. Therefore, the hairline of indicator arm 24 is set at 1,532 on the CO scale and 655 is read from the C2O scale immediately below. This latter number lies in the first sector of the C2O scale and thus corresponds to multiplication by $2^2$. This multiplication factor is compensated for by multiplying by $2^{-2}$. Therefore, $$0.1532_8 \times {10_8}^{-13} = 0.655_8 \times {10_8}^{-13} \times 2^{-2}$$
$$= 0.655_8 \times (2^3)^{-13} \times 2^{-2}$$
$$= 0.655_8 \times (2^{-43})_8$$

(note that $3 \times 13_8 = 41_8$).

EXAMPLE K

Reduce $2.64_8 \times {10_8}^6$ to normalized form.

$= \mathbf{0.264_8 \times {10_8}^7}$

Note again that the fraction is not in normalized form. Therefore, the hairline of indicator arm 24 is set at 264 on the CO scale. This latter number lies in the second sector of the C2O scale and thus corresponds to a multiplication factor of 2. To compensate for this factor a final multiplication by $2^{-1}$ is required. Therefore, $$
\begin{aligned}
0.264_8 \times 10_8{}^7 &= 0.550_8 \times 10_8{}^7 \times 2^{-1} \\
&= 0.550_8 \times (2^{3}) \times 2^{-1} \\
&= 0.550_8 \times (2^{24})_8
\end{aligned}
$$

Located inwardly from the C2O scale on reverse face 22 of the calculator is a spiral decimal conversion scale having a plurality of labels, DM, where $M$ preferably represents a number from −5 to +5, including 0. The decimal conversion scales include:

- D4 scale: decimal numbers between $8^4 = 4{,}096$ and $8^5 = 32768$
- D3 scale: decimal numbers between $8^3 = 512$ and $8^4 = 4096$
- D2 scale: decimal numbers between $8^2 = 64$ and $8^3 = 512$
- D1 scale: decimal numbers between $8^1$ and $8^2 = 64$
- D0 scale: decimal numbers between $8^0$ (=1) and $8^1$
- D−1 scale: decimal numbers between $8^{-1}$ (=0.125) and $8^0$
- D−2 scale: decimal numbers between $8^{-2}(=1.5625 \times 10^{-2})$ and $8^{-1}$
- D−3 scale: decimal numbers between $8^{-3}(=1.953125 \times 10^{-3})$ and $8^{-2}$
- D−4 scale: decimal numbers between $8^{-4}(=2.44140625 \times 10^{-4})$ and $8^{-3}$
- D−5 scale: decimal numbers between $8^{-5}(=3.0517578125 \times 10^{-5})$ and $8^{-4}$ The spiral D scales enable octal numbers, preferably between $10_8{}^5$ and $10_8{}^{-5}$, to be readily converted into their decimal equivalents. The angular locations $Y$ of the decimal numbers $X$, where $8^0 \leq X < 8^M$, with reference to a particular DM scale index are determined by the following equation:

$$Y = 360° \text{ [fractional part of } \{(\log_{10}X)\ (\log_8 10)\}]$$

Each such decimal number $X$ lies in the range of one D scale. $X$ is found on the DM scale if $8^M \leq X < 8^{M+1}$. Thus, where $X$ is the decimal number 30, which lies between $8^1$ and $8^2$ (i.e., $M = 1$), the number 30 is found on the D1 scale. The angular location of $Y$ of 30 with reference to the DO scale index "1" is determined from the above equation. That is, $$
\begin{aligned}
Y &= 360° \text{ [fractional part of } \{(\log_{10}30)\ (\log_8 10)\}] \\
&= 360° \text{ [fractional part of } \{(1.4771)\ (1.107)\}] \\
&= 360° (1.63)] \\
&= 360° (0.63) = 227°
\end{aligned}
$$

Therefore, the decimal number 30 is located at 227° in a clockwise direction from DO scale index 1.

Similarly, the relative positions of decimal numbers X, where $8^{-M} \leq X < 8^0$, with reference to a particular fractional DM scale index $= \mathbf{8^{-M}}$ are determined by the following relationship:

$$Y = 360° \{\text{positive fractional part of } [(\log_{10}X)\ (\log_8 10)]\}$$

Each such fractional decimal number X lies in the range of one fractional D scale. X is found on the D-M scale if $8^M \leq X < 8^{M+1}$, where M represents a negative integer. Thus, where X is a fractional decimal number 0.005, which lies between $8^{-3}$ and $8^{-2}$ (i.e., M = −3), the number 0.005 is found on the D-3 scale. The angular location Y of 0.005 with reference to the D0 scale index "1" is determined from the above equation as follows:

$$
\begin{aligned}
Y &= \mathbf{360°} \{\text{positive fractional part of } [\log 0.005)\ (\log_8 10)]\} \\
Y &= \mathbf{360°} \{\text{positive fractional part of } [(=2.3001)\ (1.107)\ ]\} \\
Y &= \mathbf{360°} \{\text{positive fractional part of } (-2.545)\}.
\end{aligned}
$$

The positive fractional part of (−2.545)
= positive fractional part of (−3 + 0.455)
= 0.455. Thus, $$Y = 360° (.455) = 164°$$

clockwise from the DO scale index. In the above equations, the factors 360° may be replaced by L which represents the length of a linear embodiment of this invention.

To convert an octal number $X$ to its decimal equivalent, the octal number is set on the outer CO scale, and its decimal equivalent is read on the DM scale, if the number lies between $10_8{}^M$ and $10_8{}^{M+1}$. If conversion of a normalized octal floating point number is required, the number is first converted to an octal fraction times the largest power of $10_8$ times any remaining factors of 2, as $2^2$ or 2. If the remaining factor is 2, the hairline of the indicator is set at the given fraction on the first sector of the C2O scale and the decimal equivalent of that number is read on the D scale whose numeric label corresponds to the exponent of $10_8$. If the remaining factor is $2^2$, the hairline is set at the given fraction on the second sector of the C2O scale, and the decimal equivalent of the number is read on the D scale whose numeric label corresponds to the exponent of $10_8$. If there is no remaining factor, the octal point is shifted one position to the right and the octal exponent is reduced by 1, the hairline is set at the given number on the third sector of the C2O scale, and the decimal equivalent of the number is read on the suitable D scale, as above.

EXAMPLE L

Convert $0.472_8 \times (2^{15})_8$ to decimal form $$0.472_8 \times (2^{15})_8 = \mathbf{0.472_8 \times 10_8{}^4} \times \mathbf{2}$$

The hairline of indicator arm 23 or 24 is set at 472 on the first sector of the C2O scale (since the remaining factor was 2) and the result is read under the hairline on the D4 scale. The D4 scale is used because this particular scale contains decimal numbers $X$ whose octal representations $\xi$ lie in the range $10_8{}^4 \leq \xi < 10_8{}^5$. On the D4 scale the hairline is at about 5024. Therefore, $$0.472_8 \times (2^{15})_8 = 5024_{10}.$$

EXAMPLE M

Convert $0.774_8 \times (2^{13})_8$ to decimal form $$0.774_8 \times 2^{13}{}_8 = 0.774_8 \times 10_8{}^3 \times 2^2$$

The hairline of the indicator arm 23 or 24 is set at 774 on the second sector of the C2O scale since the remaining factor was $2^2$, and the result is 2032, which is read at the hairline on the D3 scale. Therefore, $$0.774_8 \times (2^{13})_8 = 2032_{10}.$$

The D scales of this invention are further useful in converting decimal numbers preferably in the range between 32768 and $3.0517578125 \times 10^{-5}$ to their octal equivalents by setting the hairline of indicator arm 23 or 24 at the appropriate value on the D scale and reading the equivalent octal value on the CO scale. The suitable octal exponent is found from the D scale index. Thus, $100_{10}$ lies on the D2 scale. At the CO scale on the same radial the number 144 is provided. Hence, $$100_{10} = 1.44_8 \times 10_8{}^2.$$

The latter result is not a normalized octal floating point number. If this form is required, the conversion is easily obtained from the C2O scale. With the hairline set at 100 on the D2 scale, the number 620 appears on the first sector of the C2O scale. The first sector result corresponds to a multiplication factor of $2^{+2}$ and must therefore be compensated for by multiplying by $2^{-2}$ as follows:

$$
\begin{aligned}
100_{10} &= \mathbf{6.2_8 \times 10_8{}^2 \times 2^{-2}} \\
&= \mathbf{0.62_8} \times {}_{108}{}^3 \times \mathbf{2^{-2}} \\
&= \mathbf{0.62_8} \times (2^3)_8{}^3 \times \mathbf{2^{-2}} \\
&= \mathbf{0.62_8} \times \mathbf{2^7}.
\end{aligned}
$$

All octal or decimal fractions between about 0.001 and 1.0 may alternatively be converted to the other base using the L and LO scales on the front of the calculator. Thus, by setting the hairline of either indicator arm at an octal fraction on the LO scale immediately yields its decimal equivalent on the L scale, and vice versa. For simple fractions the use of the L and LO scales is often preferable, but if the fractions are normalized, or less than 0.001, the C2) and D scales are preferably used.

It should be appreciated that the use of the CO and C2O scales in combination with the D scales on reverse face 22 of the calculator provides a rapid means of performing octal or decimal multiplication and division operations and converting the result to the octal, normalized octal floating point, or decimal bases. For example, fixed point decimal multiplication and division operations can be performed using indicator arms 23 and 24 in conjunction with the decimal conversion scales. The resultant value is then converted to octal or normalized octal form using the CO or C2O scales, respectively. Conversely, multiplication and division of octal numbers can be performed using the CO scale. The resultant value is immediately converted to its decimal representation using the decimal conversion scales.

The present invention has been described in the context of a circular calculating 77 structure having a plurality of octal and decimal base scales in a preferred arrangement thereon. It is to be understood, however, that the scope of this invention is not limited thereto, and that various changes may be made in the structure of the calculator and the arrangement of the scales disclosed herein without departing from the scope of this invention.

What is claimed is:

2. A calculator for making numerical calculations in an octal base number system comprising:

a. base means;

b. an octal base scale on said base means having octal base numbers graduated and arranged such that the length of the scale is divided into a plurality of segments defined by indicia corresponding to the octal numbers 1 through 10, the said scale segments having graduations corresponding to fractional portions of each of the said octal numbers, and the relative positions of the numbers with reference to the origin of the scale being a function of the octal logarithms of the numbers; and c. indicator means movable relative to the base means for adding intervals corresponding to selected portions of the said octal base scale and indicating resultant values on said scale.

2. A calculator according to claim 1 wherein the said graduations are selected to correspond to at least each two-digit octal number in the range of the scale.

3. A calculator according to claim 1 wherein the said indicator means includes first and second movable members adapted to move relative to each other and relative to the base means.

4. A calculator according to claim 1 wherein:

a. the base means comprises a substantially circular member; and b. the indicator means comprise first and second radial indicator arms attached to the center of the base means, the arms being adjustable in their angular relationship to each other and rotatable relative to the base means.

5. A calculator according to claim 1 including an inverse octal base scale on said base means having an effective length equal to that of the said octal base scale and having octal base numbers graduated in descending order relative to the octal base scale and arranged such that the length of the said inverse octal base scale is divided into a plurality of segments defined by indicia corresponding to the octal numbers 1 through 10, the said scale segments having graduations corresponding to fractional portions of the numbers with reference to the origin of the scale being a function of the octal logarithms of the numbers; and wherein the said indicator means is movable relative to the said base means for adding intervals corresponding to selected portions of either of said octal base and inverse octal base scales and indicating resultant values on either of said scales.

6. A calculator according to claim 1 including an octal square scale on said base means having an effective length equal to that of the octal base scale and having octal base numbers graduated and arranged such that the first and second halves of the said octal square scale are respectively divided into a plurality of segments defined by indicia corresponding to the octal numbers 1 through 10, the said scale segments having graduations corresponding to fractional portions of each of the said octal numbers, and the relative positions of the numbers with reference to the origin of each half of the scale being a function of the octal logarithms of the numbers; and wherein the said indicator means is movable relative to the said base means for adding intervals corresponding to selected portions of either of said octal base and octal square scales and indicating resultant values on said scales.

7. A calculator according to claim 1 including an octal logarithm scale on said base means having an effective length equal to that of the octal base scale and having octal base fractions graduated linearly and arranged such that the length of the said octal logarithm scale is divided into a plurality of segments defined by indicia corresponding to octal fractions between 0 and 1, the said scale segments having graduations corresponding to fractional portions of each of the said octal fractions; and wherein the said indicator means is movable relative to the said base means for adding intervals corresponding to selected portions of either of said octal base and octal logarithm scales and indicating resultant values on said scales.

8. A calculator according to claim 1 including a plurality of decimal conversion scales on said base means, each scale having an effective length equal to that of the octal base scale with decimal base numbers graduated from $8^M$ to $8^{M+1}$ where $M$ *represents a positive integer, a negative integer, or zero, the relative positions of the said numbers with reference to the origin of each scale being a function of the octal logarithms of the numbers; and* wherein the said indicator means is movable relative to the said base means for adding intervals corresponding to selected portions of said octal base and decimal conversion scales and indicating resultant values on said octal base and decimal conversion scales.

9. A calculator according to claim 1 including an octal normalization scale on said base means having an effective length equal to that of the octal base scale and having octal base numbers graduated and arranged such that the said octal normalization scale is divided into three identical sections of equal length, each section being further divided into a plurality of segments defined by indicia corresponding to the octal numbers 4 through 10, the said scale segments having graduations corresponding to fractional portions of each of said octal numbers, and the relative positions of the numbers with reference to the origin of each scale section being a function of the octal logarithms of the numbers; and wherein the said indicator means is movable relative to the said base means for adding intervals corresponding to selected portions of said octal base scale and indicating resultant values on said octal base and octal normalization scales.

10. A calculator according to claim 9 including a plurality of decimal conversion scales on said base means, each scale having an effective length equal to that of the octal base and octal normalization scales with decimal base numbers graduated from $8^M$ to $8^{M+1}$ where $M$ represents a positive integer, a negative integer, or zero, the relative positions of the said numbers with reference to the origin of each scale being a function of the octal logarithms of the numbers; and wherein the said indicator means is movable relative to the said base means for adding intervals corresponding to selected portions of said octal base and decimal conversion scales and indicating resultant values on said octal base, octal normalization, and decimal conversion scales.

11. The calculator of claim 1, wherein said calculator is a slide rule calculator means and further comprising:

scale means bearing indicia representing number base 10 in logarithmic intervals of logarithm base 10; and scale means for converting indicia representing number base 8 to indicia representing number base 10.

12. The slide rule of claim 11, wherein:

said conversion scale means includes a scale element bearing indicia representing number base 10 in logarithmic intervals of logarithm base 8.

13. The slide rule of claim 12, wherein:

said conversion scale means include $k$ said scale elements corresponding to a range of $\underline{8}^{k_1}$ to $\underline{8}^{k_2}$, where $k_2$ is greater than $k_1$, $k_2 - k_1 = k$ and $k$ is a positive integer.

14. The calculator of claim 1, wherein said calculator is a slide rule calculator means and further comprising:

scale means bearing indicia in logarithmic intervals of logarithm base 10;

scale means bearing indicia in equal intervals modulus 8 representing number base 8; and scale means bearing indicia in equal intervals modulus 10 representing number base 10.

15. The slide rule of claim 14, wherein:

said scale means are circular and concentric.

16. The slide rule of claim 15, wherein:

said indicator means includes a pair of cursor elements rotatable about the common center of said concentric scale means.

17. The slide rule of claim 14, wherein:

said logarithm base 8 scale means include $k$ scale elements corresponding to a range of $\underline{8}^{k_1}$ to $\underline{8}^{k_2}$, where $k_2$ is greater than $k_1$, $k_2 - k_1 = k$ and $k$ is a positive integer.

18. The slide rule of claim 17, wherein:

$k$ is $10_{10}$, $k_1$ is −5 and $k_2$ is +5.

* * * * *